(12) United States Patent
Toda et al.

(10) Patent No.: US 7,290,939 B2
(45) Date of Patent: *Nov. 6, 2007

(54) VEHICLE-USE BEARING APPARATUS

(75) Inventors: Kazutoshi Toda, Tomdabaya (JP); Shinichirou Kashiwagi, Yao (JP); Tomohiro Ishii, Kashiba (JP); Daisaku Tomita, Kashiwara (JP)

(73) Assignee: JTEKT Corporation, Osaka (JP)

( * ) Notice: Subject to any disclaimer, the term of this patent is extended or adjusted under 35 U.S.C. 154(b) by 205 days.

This patent is subject to a terminal disclaimer.

(21) Appl. No.: 10/783,447

(22) Filed: Feb. 20, 2004

(65) Prior Publication Data

US 2004/0165804 A1    Aug. 26, 2004

Related U.S. Application Data

(62) Division of application No. 10/007,813, filed on Dec. 5, 2001, now Pat. No. 6,722,786.

(30) Foreign Application Priority Data

Dec. 5, 2000   (JP) ............................ P2000-370691
Aug. 30, 2001  (JP) ............................ P2001-260878
Oct. 31, 2001  (JP) ............................ P2001-334695

(51) Int. Cl.
    *F16C 19/08*    (2006.01)
(52) U.S. Cl. ...................................... 384/544
(58) Field of Classification Search ................ 384/537, 384/544, 589, 585, 548
    See application file for complete search history.

(56) References Cited

U.S. PATENT DOCUMENTS 6,722,786 B2 *   4/2004   Toda et al. .................. 384/537
2002/0174544 A1* 11/2002   Webb et al. ................. 384/544

* cited by examiner

*Primary Examiner*—Thomas R. Hannon
(74) *Attorney, Agent, or Firm*—Jordan and Hamburg LLP

(57) ABSTRACT

A vehicle-use bearing apparatus including a hub wheel formed of steel material to which a wheel is mounted and a rolling bearing mounted to an outer periphery of the hub wheel. An end portion of the hub wheel is expanded radially outward toward an inner ring provided to the rolling bearing to be formed into a caulked portion and a percentage of sulfur content is adjusted to be 0.020% by weight or less in steel material of which the 10 caulked portion is formed.

10 Claims, 8 Drawing Sheets

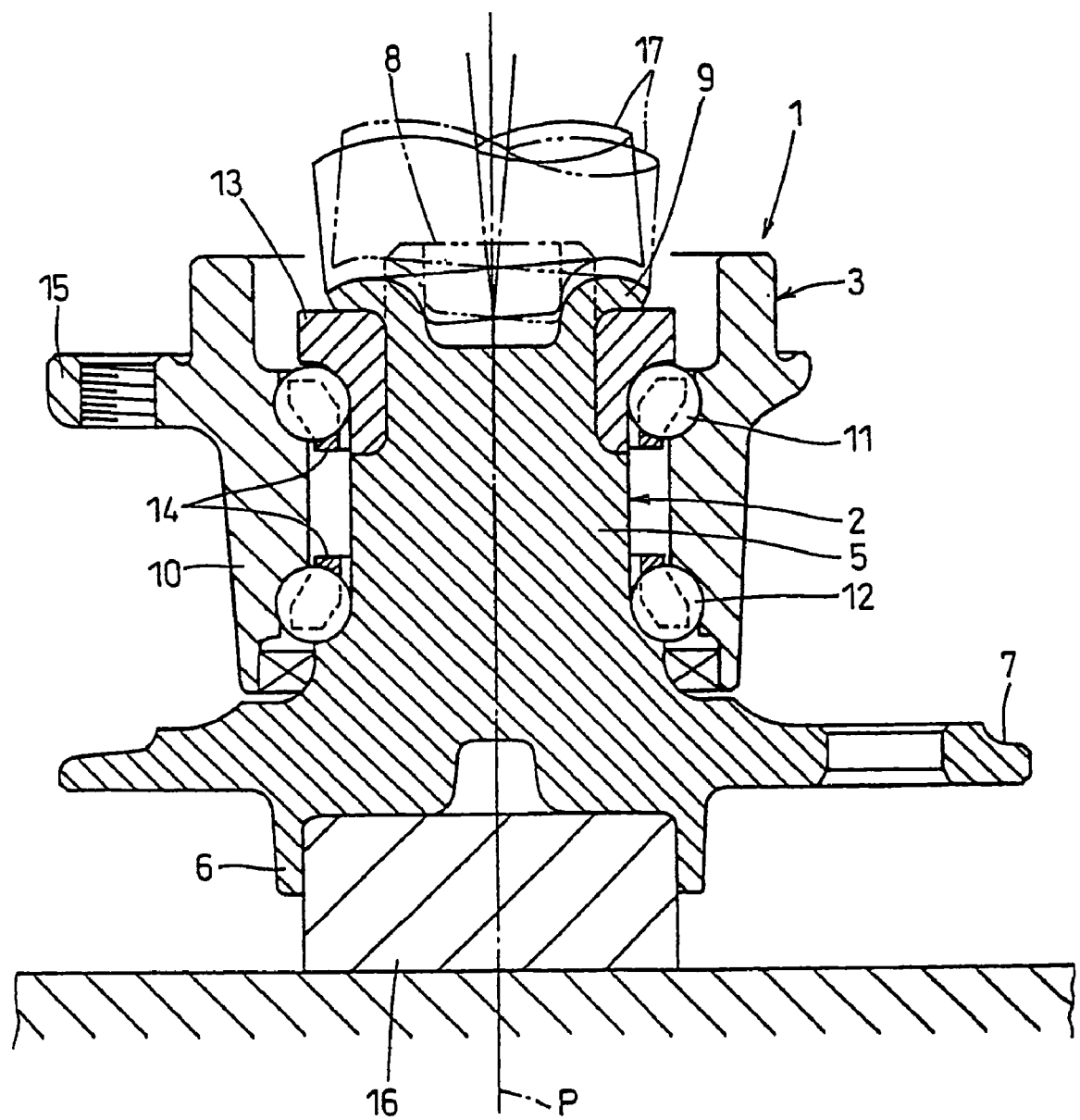
F I G. 1

F I G. 6
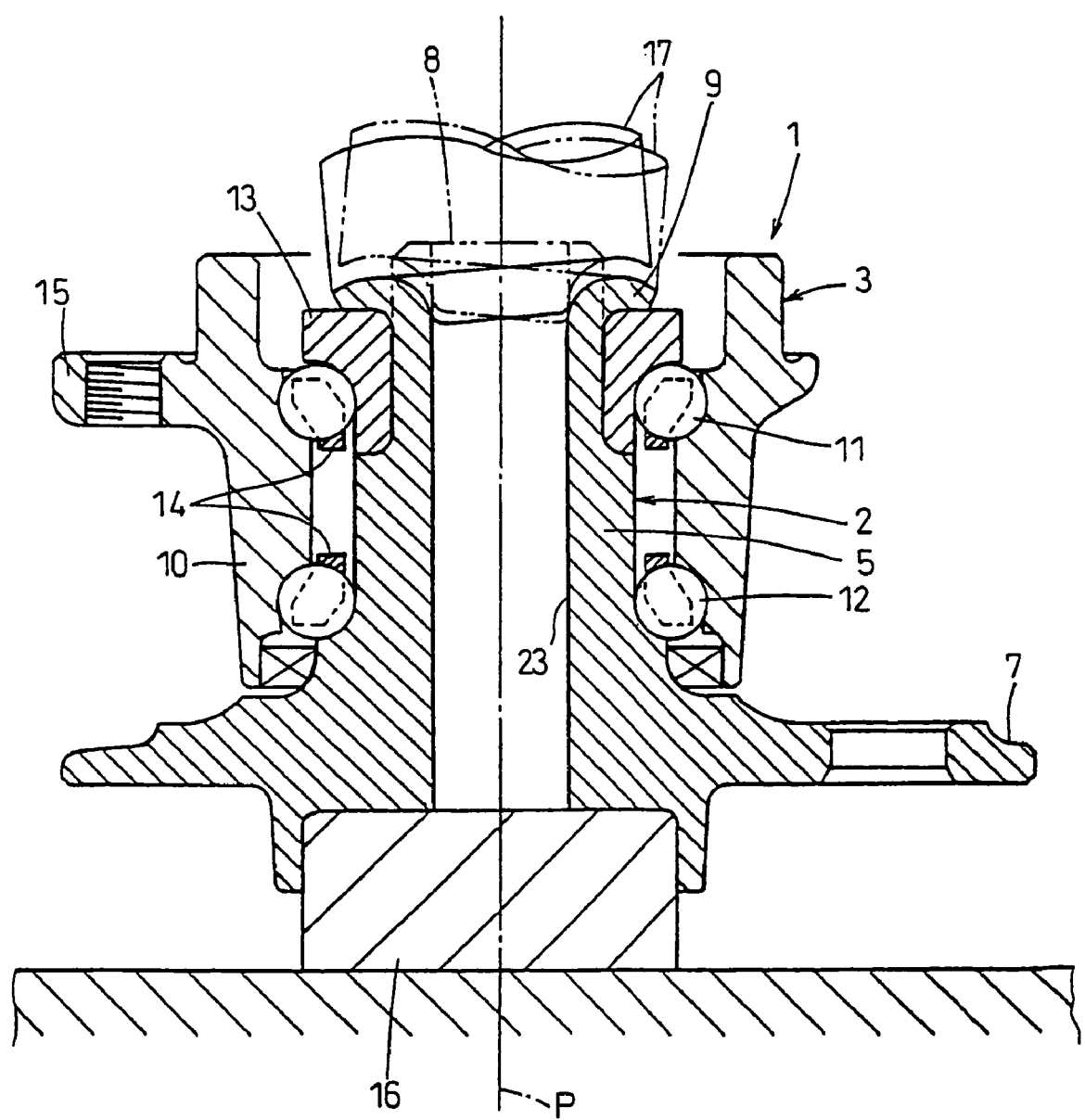

F I G. 7
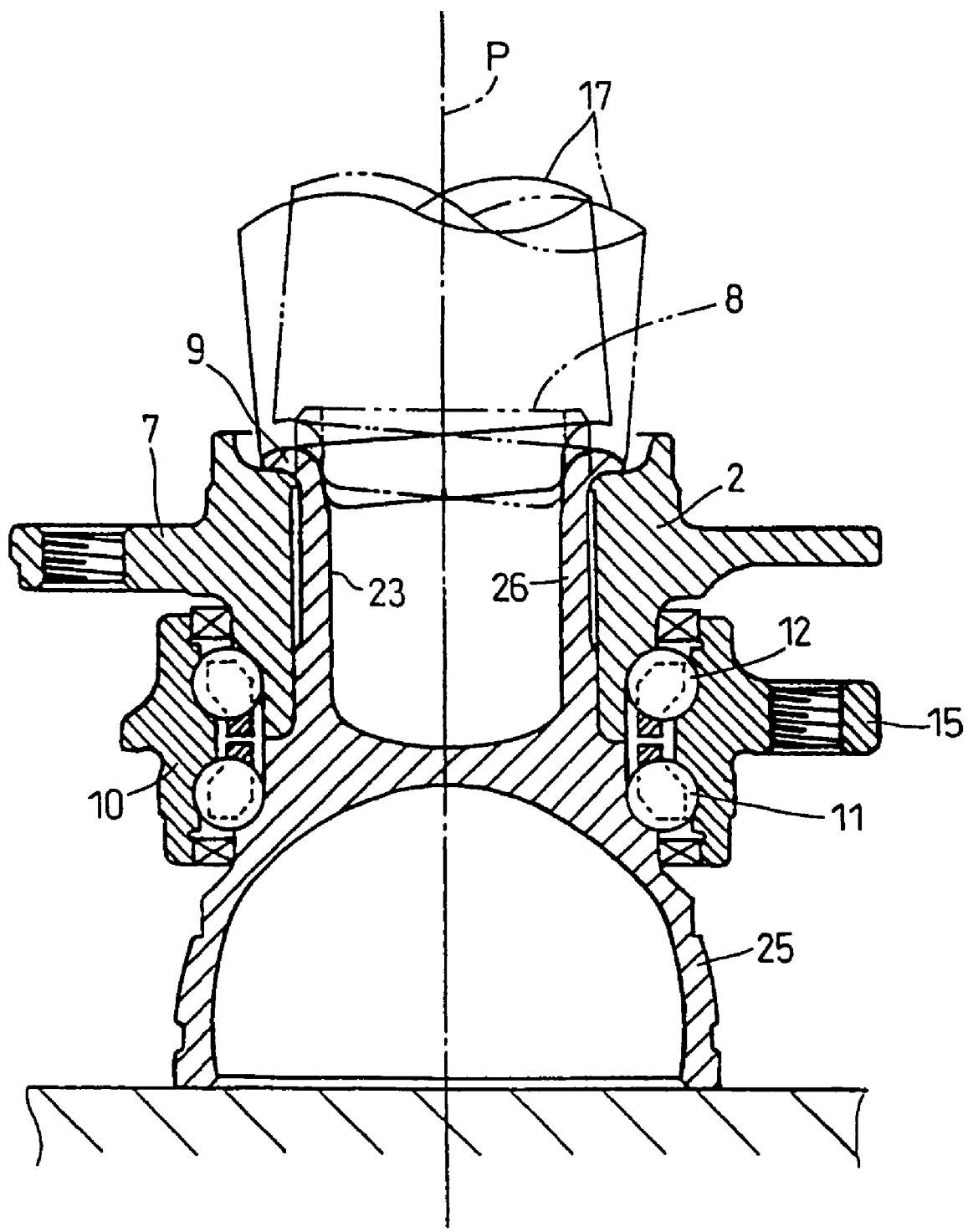

VEHICLE-USE BEARING APPARATUS

REFERENCE TO RELATED APPLICATION

This is a Divisional application of application Ser. No. 10/007,813, filed Dec. 5, 2001 now U.S. Pat. No. 6,722,786.

BACKGROUND OF THE INVENTION

1. Field of the Invention

The present invention relates to a hub unit to which a wheel and a disc rotor of a disc brake apparatus are mounted and other vehicle-use bearing apparatuses. More particularly the present invention relates to a vehicle-use bearing apparatus provided with a double row rolling bearing with vertex of contact angles outside of bearing on an outer periphery of a hub wheel.

2. Description of the Related Art

In a conventional vehicle-use bearing apparatus a cylindrical recessed portion is formed at an axial end of a hub wheel. The portion is bent and deformed radially outward and caulked onto an outer end face of an inner ring of a rolling bearing by using a rolling caulking jig to thereby prevent the rolling bearing from coming off the hub wheel and to apply pre-load to the rolling bearing.

The hub wheel is formed by using steel material such as JIS (Japanese Industrial Standards) S40C to S58C and SUJ2, for example. Such material includes sulfur for convenience in turning and in order to obtain stability of quality. For example, a percentage of sulfur content in steel material is specified to be 0.035% by weight or less when the steel material of JIS S40C to S58C is used as the steel material for the hub wheel and a percentage of sulfur content in steel material is specified to be 0.025% or less when the steel material of SUJ2 is used respectively in terms of convenience in turning and stability of quality for the steel material.

The present inventors found that a minute crack occurred in the caulked portion when rolling caulking was carried out and pursued study of it. As a result, because a percentage of sulfur content in the steel material to be used was set at an upper limit value or a value approaching the upper limit value in order to further improve a turning property and stability of quality, manganese sulfide was liable to be generated in the steel material by chemical combination of sulfur with manganese included in the steel material. The manganese sulfide which is a nonmetallic inclusion generated in the steel material became a starting point of a crack in the rolling caulking. Then, the inventor further pursued study and found a percentage of sulfur content with which the crack could be suppressed.

SUMMARY OF THE INVENTION

Therefore, it is a main object of the present invention to provide a vehicle-use bearing apparatus in which occurrence of a minute crack in a caulked portion can be suppressed in processing of the caulked portion by properly adjusting a specified percentage of sulfur content in steel material.

Other objects, features, and advantages of the invention will become apparent from the following descriptions.

In brief, a vehicle-use bearing apparatus according to the present invention includes a hub wheel formed of steel material to which a wheel is mounted and a rolling bearing mounted to an outer periphery of the hub wheel. An end portion of the hub wheel is expanded radially outward toward an inner ring provided to the rolling bearing to be formed into a caulked portion.

A percentage of sulfur content is adjusted to be 0.020% by weight or less with which occurrence of a crack starting from manganese sulfide in forming the caulked portion can be suppressed in steel material of which the caulked portion is formed.

In case of the present invention, the percentage of sulfur content is adjusted to be 0.020% by weight or less with respect to the specification. Thus generation of manganese sulfide or a nonmetallic inclusion can be suppressed and occurrence of the minute crack starting from manganese sulfide in the caulked portion in processing of the caulked portion can be suppressed. As a result, few vehicle-use bearing apparatuses have to be discarded due to the minute crack generated in the caulked portion and a supply performance of the product can be improved. In the present invention, preferably, a steel type of the steel material of which the caulked portion is formed is one selected from among JIS S40C to S58C including 0.37% by weight to 0.61% by weight carbon, SAE 1040 to 1095 including 0.37% by weight to 1.03% by weight carbon, SUJ1 to SUJ5 including 0.95% by weight to 1.10% by weight carbon, and SAE 52100 including 0.98% by weight to 1.10% by weight carbon. A percentage of sulfur content in the selected steel material is preferably adjusted to be 0.020% by weight or less. With such adjustment, because occurrence of the minute crack in the caulked portion can be suppressed while maintaining a turning property of material in forming a caulking cylindrical recessed portion by inclusion of sulfur, few products have to be discarded to thereby improve the supply performance of the product.

BRIEF DESCRIPTION OF THE DRAWINGS

These and other objects as well as advantages of the invention will become clear by the following description of preferred embodiments of the invention with reference to the accompanying drawings, wherein:

FIG. 1 is a sectional view of a vehicle-use bearing apparatus according to a preferred embodiment of the present invention;

FIG. 6 is a sectional view of a vehicle-use bearing apparatus according to yet another preferred embodiment of the invention;

FIG. 7 is a sectional view of a vehicle-use bearing apparatus according to yet another preferred embodiment of the invention;

DETAILED DESCRIPTION OF PREFERRED EMBODIMENTS

Figure 2:
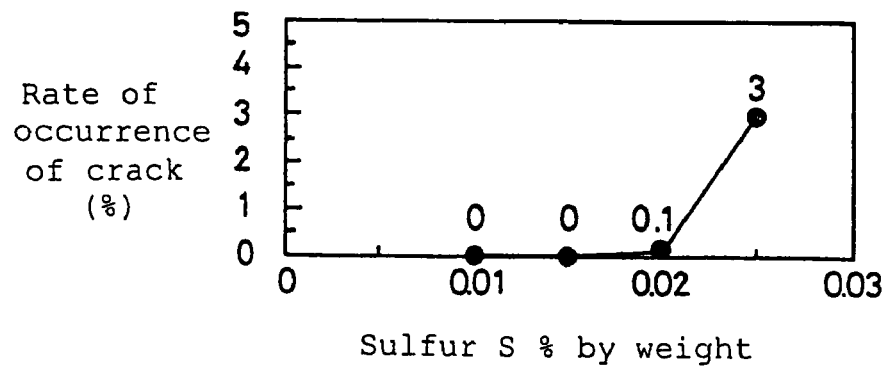
FIG. 2 is a graph in which a horizontal axis designates a percentage of sulfur content and a vertical axis designates a rate of occurrence of a crack in a caulked portion in the vehicle-use bearing apparatus in FIG. 1.

Referring to FIG. 1 a vehicle-use bearing apparatus 1 is a structure applied to a follower-wheel side of a vehicle and includes a hub wheel 2 as a follower shaft to which a wheel is mounted and a double row rolling bearing 3 for supporting the hub wheel 2 for rotation with respect to a vehicle body about an axial center P. This bearing 3 is a double row angular contact ball bearing with vertex of contact angles outside of bearing.

The hub wheel 2 is formed of a small-diameter portion 5 corresponding to a vehicle inner side, a large-diameter portion 6 corresponding to a vehicle outer side, and a hub flange 7 formed at the large-diameter portion 6 to project radially outward. To the hub flange 7, a brake disc rotor (not shown) is fixed.

On an end face of the small diameter portion 5 of the hub wheel 2 on the vehicle inner side, a caulking cylindrical recessed portion 8, which is shown with a phantom line, is formed by turning. By deforming a peripheral portion of the cylindrical recessed portion 8 to increase a diameter of the peripheral portion radially outward, a caulked portion 9 is formed. This caulked portion 9 is pressed against an end face of an inner ring member 13 which will be described later.

The bearing 3 includes a single outer ring member 10, a plurality of balls 11 and 12, the inner ring member 13, and retainers 14.

A mounting flange 15 is formed to project radially outward on an outer peripheral face of the outer ring member 10 and a support member (not shown) called a knuckle or a carrier is faxed to the flange 15. Thus, the outer ring member 10 is supported so as not to rotate with respect to the vehicle body. The outer ring member 10 has on an inner peripheral face thereof two rows of raceways adjacent to each other in an axial direction.

The plurality of balls 11 and 12 are arranged as rolling elements in the two rows of raceways in the outer ring member 10.

The inner ring member 13 has on an outer peripheral face thereof a single raceway which pairs up with the raceway in the outer ring member 10 on the vehicle inner side. The inner ring member 13 is fitted with an outer peripheral face of the hub wheel 2.

In the bearing 3, a necessary area of the outer peripheral face of the hub wheel 2 is used as a raceway which pairs up with the raceway in the outer ring member 10 on the vehicle outer side.

An assembly procedure of the vehicle-use bearing apparatus 1 having the above structure will be described.

First, the cylindrical recessed portion 8 is formed at the end portion of the small-diameter portion of the hub wheel 25 on the vehicle inner side.

Then, the outer ring member 10 is mounted to the hub wheel 2 through the balls 12 for the row on the vehicle outer side and the inner ring member 13 is mounted to the hub wheel 2 through the balls 11 for the row on the vehicle inner side.

Then, a caulking jig 17 is pushed against the cylindrical recessed portion 8 in such a manner as to be fitted in the cylindrical recessed portion 8 while fitting the large-diameter portion 6 of the hub wheel 2 over a caulking receiving jig 16.

Then, the caulking jig 17 is rolled about the axial center P of the hub wheel 2 and the peripheral portion of the cylindrical recessed portion 8 is deformed in such a direction as to increase the diameter of the peripheral portion to thereby form the caulked portion 9 and the caulked portion 9 is crimped onto the end face of the inner ring member 13.

Thus, the inner ring member 13 can be prevented from coming off the hub wheel 2 and predetermined pre-loads are applied to the respective rolling elements 11 and 12 to thereby manufacture the vehicle-use bearing apparatus 1.

The present embodiment is characterized in that steel material including 0.37% by weight to 1.10% by weight carbon is used as steel material of which the hub wheel 2 is formed. In this steel material, a percentage of sulfur content is adjusted to be 0.020% by weight or less and more desirably 0.015% by weight or less.

As types of the steel material of which the hub wheel 2 is formed, there are JIS S40C to S58C, SAE 1040 to SAE 1095, SUJ 1 to SUJ 5, and SAE 52100, for example.

Specified percentages of carbon content of the respective steel materials are 0.37% by weight to 0.61% by weight, 0.37% by weight to 1.03% by weight, 0.95% by weight to 1.10% by weight, and 0.98% by weight to 1.10% by weight in order.

In FIG. 2, a horizontal axis designates a percentage (% by weight) of sulfur content in the steel material. A vertical axis designates a rate of occurrence (%) of a crack in the caulked portion 9 when the steel material of the vehicle-use bearing apparatus 1 is subjected to caulking as describe above.

The caulking at this time is carried out on conditions that a pressurizing force applied by the caulking jig 17 to the hub wheel 2 is 98 kN and that the number of revolutions of the caulking jig 17 is 1,000 rpm.

In FIG. 2, if the percentage of sulfur content in the steel material is 0.025% by weight, a crack occurs in the caulked portion 9 at a rate of occurrence of about 3%. If the percentage of sulfur content is 0.020 % by weight or less, a crack hardly occurs in the caulked portion 9. If the percentage of sulfur content is 0.015% by weight or less, the rate of occurrence of the crack becomes zero. The reason why occurrence of the crack can be prevented in forming the caulked portion 9 is considered that generation of manganese sulfide which is a nonmetallic inclusion can be suppressed by setting the percentage of sulfur content at the above value.

Figure 3:
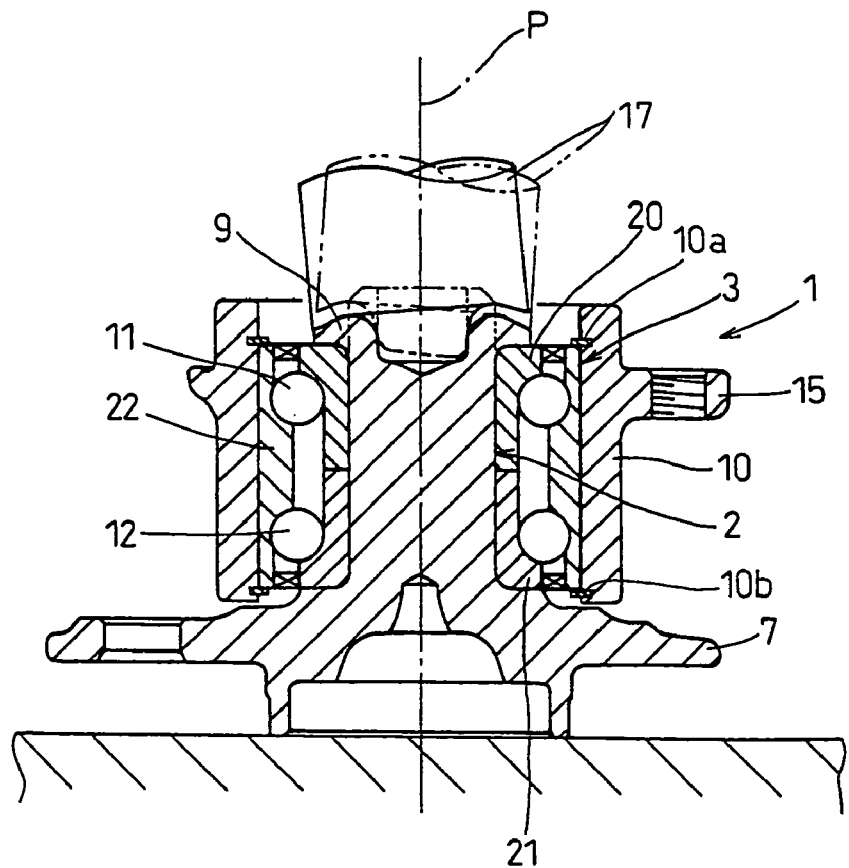
FIG. 3 is a sectional view of a vehicle-use bearing apparatus according to another preferred embodiment of the invention.

The present invention can also be applied to a vehicle-use bearing apparatus 1 on a side of a follower wheel as shown in FIG. 3. This vehicle-use bearing apparatus 1 includes a hub wheel 2, a double row rolling bearing 3, and an outer ring member 10. The bearing 3 includes a single outer ring member 22, two inner ring members 20 and 21 adjacent to each other in an axial direction, and a plurality of balls 11 and 12. The bearing 3 also constitutes a double row angular contact ball bearing with vertex of contact angles outside of bearing as well as the case of FIG. 1.

The outer ring member 22 has on an inner peripheral face thereof two rows of raceways adjacent to each other in the axial direction.

The inner ring 20 on the vehicle inner side has a raceway which pairs up with the raceway in the outer ring member 22 on the vehicle inner side.

The inner ring 21 on the vehicle outer side has a raceway which pairs up with the raceway in the outer ring member 22 on the vehicle outer side.

The plurality of balls 11 and 12 are arranged in two rows between both the raceways in the outer ring member 22 and the raceways in both the inner ring members 20 and 21.

A mounting flange 15 such as a knuckle is not provided to an outer peripheral face of the outer ring member 22 of the bearing 3. The outer ring member 10 including the mounting flange 15 is fixed to the outer peripheral face of the outer ring 22 of the bearing 3 through locating snap rings 10a and 10b.

The hub wheel 2 includes a caulked portion 9 formed by expanding a cylindrical recessed portion 8 at an end portion of the hub wheel 2 on the vehicle inner side radially outward with a caulking jig 17 and caulking the cylindrical recessed portion 8 onto an end face of the inner ring member 20 on the vehicle inner side.

Figure 4:
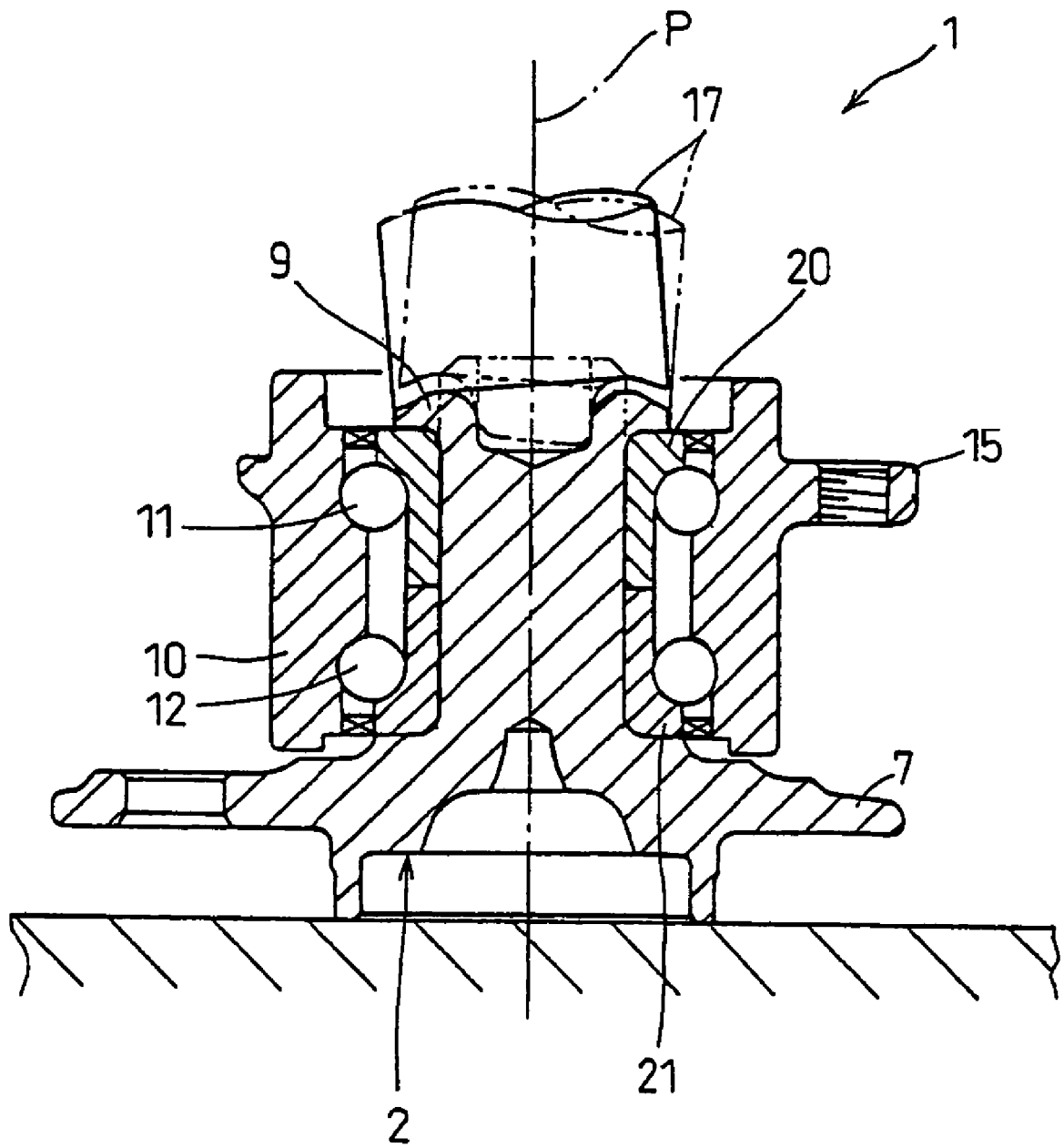
FIG. 4 is a sectional view of a vehicle-use bearing apparatus according to yet another preferred embodiment of the invention.
Figure 5:
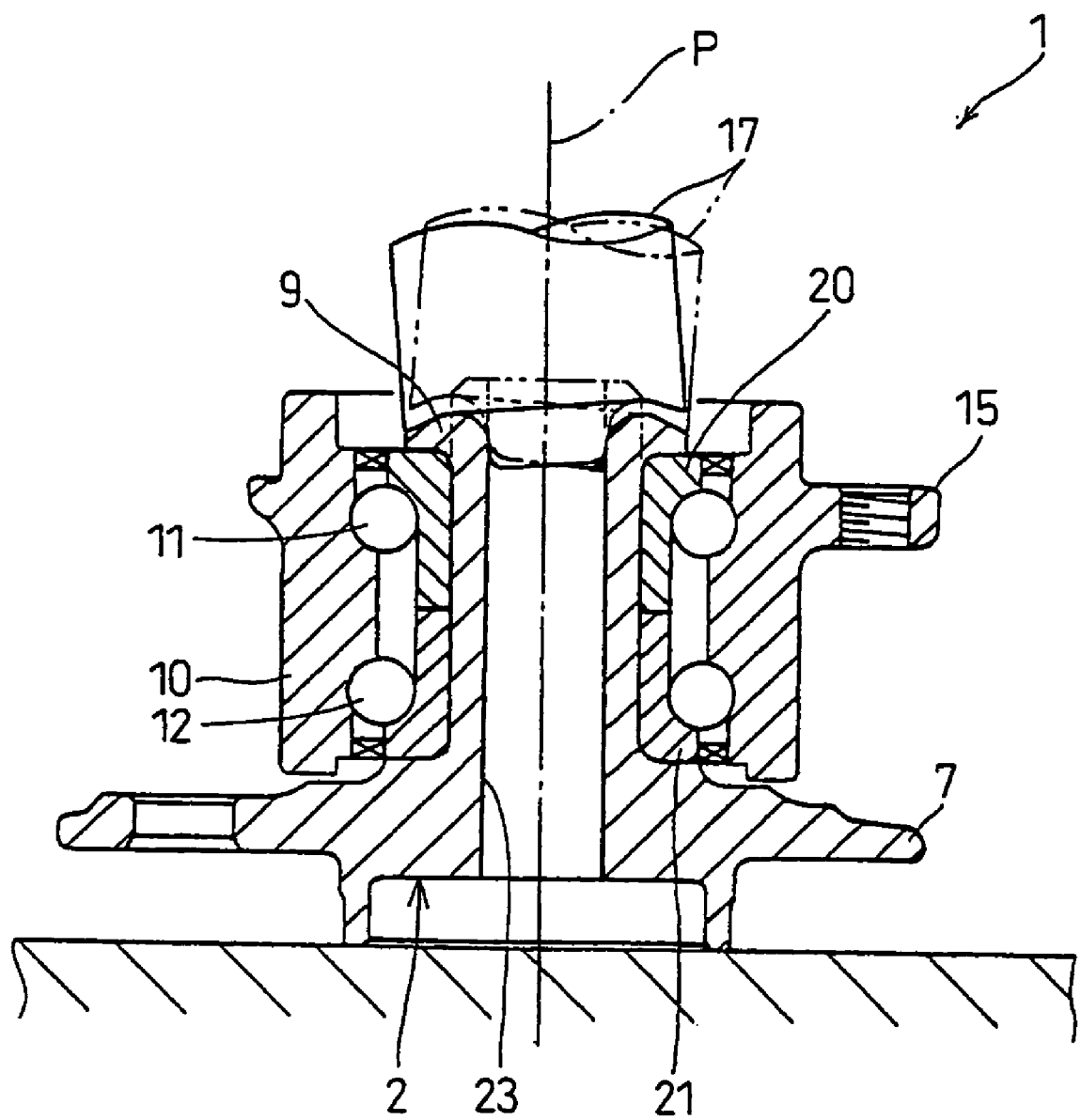
FIG. 5 is a sectional view of a vehicle-use bearing apparatus according to yet another preferred embodiment of the invention.

The present invention can be applied to a vehicle-use bearing apparatus 1 on a side of a flower wheel as shown in FIG. 4. This vehicle-use bearing apparatus 1 has a structure formed by integrating the outer ring member 22 and the other outer ring member 10 in the bearing 3 of the vehicle-use bearing apparatus 1 shown in FIG. 3. Because other structures are similar to those of the vehicle-use bearing apparatus 1 shown in FIG. 3, description of them will be omitted. The invention can be applied to a vehicle-use bearing apparatus 1 on a side of a driving wheel as shown in FIG. 5. In this vehicle-use bearing apparatus 1, a central hole 23 through which a power transmitting shaft (not shown) is inserted is formed at a center of the hub wheel 2. Because other structures of the vehicle-use bearing apparatus are similar to those of the vehicle-use bearing apparatus 1 shown in FIG. 4, description of them will be omitted.

The present invention can be applied to a vehicle-use bearing apparatus 1 on a side of a driving wheel as shown in FIG. 6. In this vehicle-use bearing apparatus 1, a central hole 23 through which a power transmitting shaft (not shown) is inserted for rotation integral with the hub wheel 5 is formed at a center of the hub wheel 2 of the vehicle-use bearing apparatus 1 shown in FIG. 1. Because other structures are similar to those of the vehicle-use bearing apparatus 1 shown in FIG. 1, description of them will be omitted.

The present invention can be applied to a vehicle-use bearing apparatus 1 on a side of a driving wheel as shown in FIG. 7. In this vehicle-use bearing apparatus 1, a hollow rotary shaft 26 is formed integrally with a bowl-shaped outer ring member 25 of a constant velocity joint to which a driving force of an engine is transmitted. The hollow rotary shaft 26 is inserted into a central hole 23 of the hub wheel 2 from a vehicle inner side. The bowl-shaped outer ring member 25 and the hub wheel 2 are supported on an outer ring member 10 through balls 11 and 12 for rotation about an axial center P. In the case of this vehicle-use bearing apparatus 1, the hub wheel 2, the bowl-shaped outer ring member 25, the outer ring member 10 and the balls 11 and 12 also constitute the double row angular contact ball bearing with vertex of contact angles outside of bearing.

The hub wheel 2 has on an outer peripheral face thereof a hub flange 7 and the outer ring member 10 has on an outer peripheral face thereof a mounting flange 15.

In this vehicle-use bearing apparatus 1, a caulking jig 17 is fitted in a caulking cylindrical recessed portion 8 at an end portion of the rotary shaft 26 on a vehicle outer side. The cylindrical recessed portion 8 is crimped onto an end face of the hub wheel 2 by rolling the caulking jig 17 about the axial center P.

Figure 8:
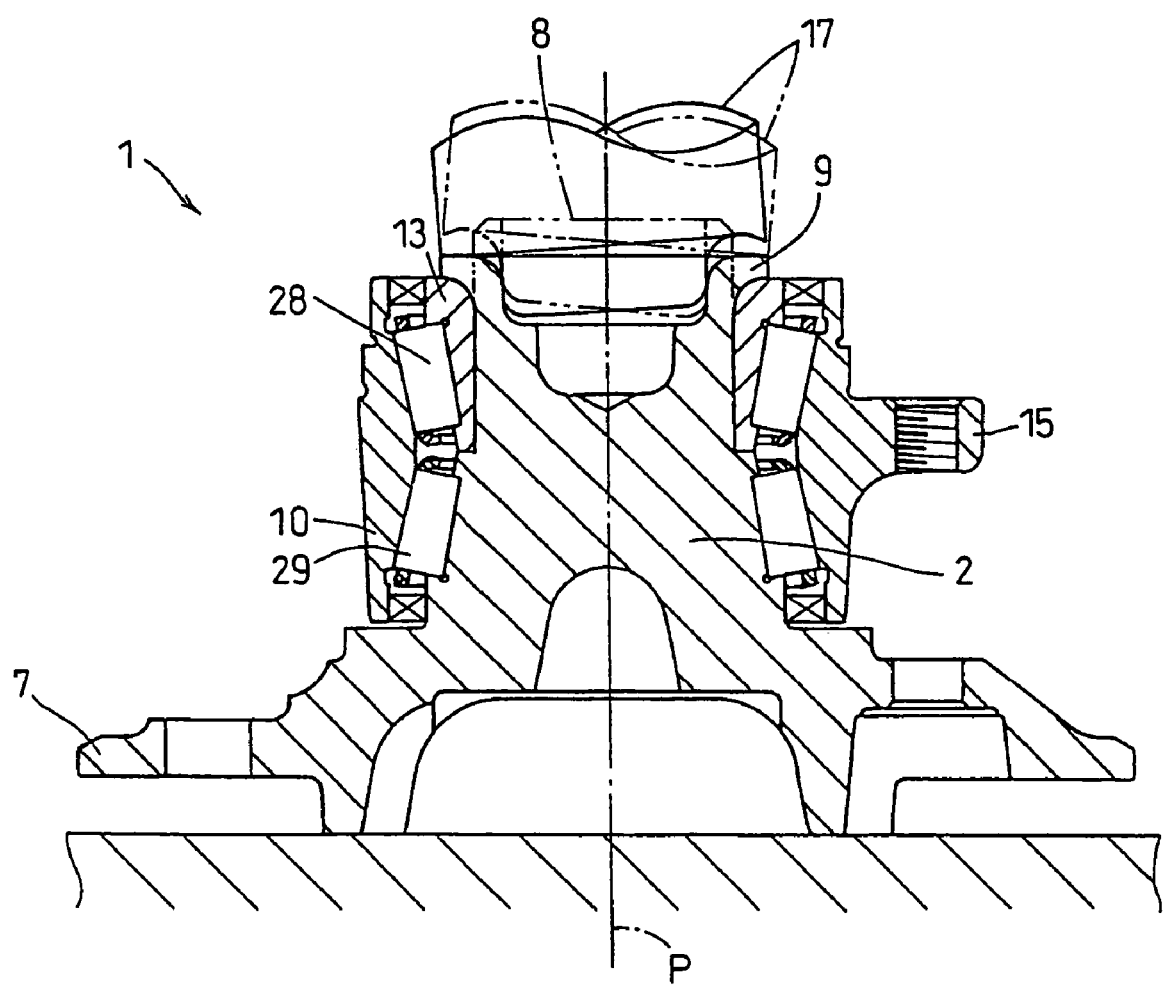
FIG. 8 is a sectional view of a vehicle-use bearing apparatus according to yet another preferred embodiment of the invention.

The present invention can be applied to a vehicle-use bearing apparatus 1 on a side of a follower wheel as shown in FIG. 8. In this vehicle-use bearing apparatus 1, a hub wheel 2 and an inner ring member 13 are supported for rotation about an axial center P and constitute the double row angular contact ball bearing with vertex of contact angles outside of bearing on an outer ring member 10 through double-row conical rollers 28 and 29 as rolling elements. The inner ring member 13 is fitted over an end portion of the hub wheel.

A midpoint area of an outer peripheral face of the hub wheel 2 is used as an inner ring raceway for the conical rollers 29 in the row on a vehicle outer side. An outer peripheral face of the inner ring member 13 is used as an inner ring raceway for the conical rollers 28 in the row on a vehicle inner side.

The hub wheel 2 has on an outer peripheral face thereof a hub flange 7 and the outer ring member 10 has on an outer peripheral face thereof a mounting flange 15. In this vehicle-use bearing apparatus 1, a caulking jig 17 is fitted in a caulking cylindrical recessed portion 8 at the end portion of the hub wheel 2 on a vehicle inner side. The caulking cylindrical recessed portion 8 is crimped onto an end face of the inner ring member 13 by rolling the caulking jig 17 about the axial center P.

As another example of the vehicle-use bearing apparatus 1 for which the double-row conical rollers 28 and 29 are used as shown in FIG. 8, there is a vehicle-use bearing apparatus (not shown) in which a pair of inner ring members adjacent to each other in an axial direction are provided and outer peripheral faces of the inner ring members are respectively used as inner ring raceway faces for the conical rollers.

Furthermore, as another example of the vehicle-use bearing apparatus for which the double-row conical rollers are used, a central hole through which a power-transmitting shaft is inserted is formed at a center of a hub wheel to use the hub wheel as a vehicle-use bearing apparatus on a side of a driving wheel.

Figure 9:
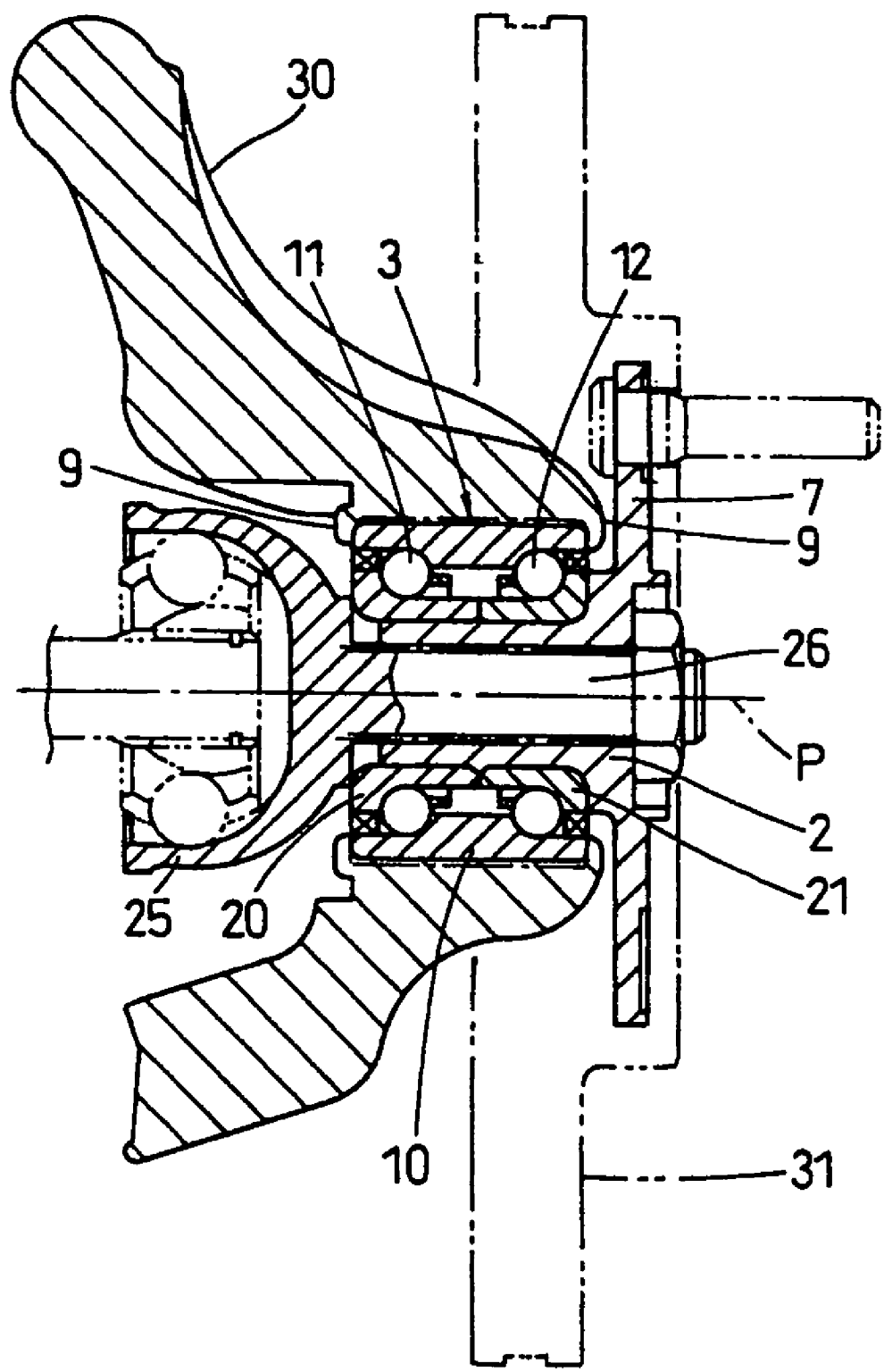
FIG. 9 is a sectional view of a vehicle-use bearing apparatus according to yet another preferred embodiment of the invention.

The present invention can be applied to a vehicle-use bearing apparatus 1 on a side of a driving wheel shown in FIG. 9. In this vehicle-use bearing apparatus 1, a double row rolling bearing 3 for supporting a hub wheel 2 for rotation about an axial center P includes a pair of inner ring members 20 and 21 through which the hub wheel 2 is inserted for rotation with the inner ring members 20 and 21 about the axial center P and an outer ring member 10 disposed on an outside through balls 11 and 12 for which outer peripheral faces of the respective inner ring members 20 and 21 are used as inner ring raceway faces. This double row rolling bearing 3 constitutes a double row angular contact ball bearing with vertex of contact angles outside of bearing.

The outer ring member 10 of this double row rolling bearing 3 is press fitted into a through hole of a support member (knuckle or carrier) 30 mounted to a vehicle body.

The hub wheel 2 has a hub flange 7 on and to which a brake disc rotor 31 is placed and mounted and a rotary shaft 26 integrally formed with a bowl-shaped outer ring member 25 of a constant velocity point is fitted in a central hole of the hub wheel 2 for rotating with the hub wheel 2.

Then, a caulked portion 9 is formed by respectively deforming opposite portions of the through hole of the support member 30 radially inward toward end faces of the outer ring 10.

It is also possible to form a stopper extending toward the axial center P at the portion of the through hole on the vehicle outer side in forming the support member 30 and to deform the portion of the through hole on the vehicle inner side radially inward to form the caulked portion 9 after press fitting the outer ring member 10 into the through hole of the support member 30. In any of the above vehicle-use bearing apparatuses 1, a percentage of carbon content is adjusted to be 0.37% by weight to 1.10% by weight and a percentage of sulfur content is adjusted to be 0.020% by weight or less and desirably 0.015% by weight or less in the steel material of which the caulked portion 9 is formed.

Although a boss portion or an end portion is employed as a receiving position in the vehicle-use bearing apparatus 1 in caulking in each the above embodiment, the receiving position is not limited to this and may be a flange portion, for example. It is also possible to carry out caulking while employing two or more portions among the boss portion, the end portion, and the flange portion as the receiving positions.

In any case, generation of manganese sulfide which is a nonmetallic inclusion can be suppressed by setting the percentage of carbon content and the percentage of sulfur content and thus, occurrence of the minute crack in forming the caulked portion 9 can be prevented. As a result, no products are discarded, a cost of a product is stabilized, and supply performance of the product can be improved.

Although S55C is used and the steel material in which the percentage of carbon content is set at 0.52% by weight to 0.58% by weight and the percentage of sulfur content is set at 0.020% by weight or less or the steel material in which the percentage of sulfur content is set at 0.015 by weight or less is used as material of which the caulked portion 9 is formed in each the above embodiment, SUJ2 (alloy steel) may also be used as the material of which the caulked portion 9 is formed.

In the case of this SUJ2, a crack occurs in the caulked portion 9 in about 3% of products if the percentage of sulfur 12 content is 0.025% by weight. Therefore, when the alloy steel of a kind of SUJ2 is used, the percentage of carbon content is set at 1.10% by weight and the percentage of sulfur content is adjusted to be 0.020% by weight to produce the products. As a result, generation of MnS (manganese sulfide) which is a nonmetallic inclusion can be suppressed and a crack hardly occurs in the caulked portion 9 similarly to the case in which S55C is used. When the percentage of sulfur content is set at 0.015% by weight or less, a rate of occurrence of the crack becomes zero, no products are discarded, a cost of the product is stabilized, and supply performance of the product can be improved.

Although S55C or SUJ2 is employed as the steel type to be used in each the above embodiment, the steel type is not limited to this and it is also possible to use S40C to S58C, SAE1040 to SAE1095, SUJ1 to SUJ5, and SAE52100 excluding S55C and SUJ2 in some cases and to set the percentage of sulfur content at 0.020% by weight or 0.015% by weight in the steel material. In any case, operations and effects similar to those of each the above embodiment can be obtained.

While there has been described what is at present considered to be preferred embodiments of this invention, it will be understood that various modifications may be formed therein, and it is intended to cover in the appended claims all such modifications as fall within the true spirit and scope of this invention.

What is claimed is:

1. A vehicular bearing apparatus comprising:
    a rolling bearing having an outer ring and an inner ring;
    a support member fixing said outer ring to a vehicle body;
    a rotating member disposed to rotate with said inner ring and relative to the vehicle body;
    a deformable material portion deformed to fix at least a portion of said inner ring in place and to secure said rotating member to rotate with said inner ring;
    said deformable material portion is formed of a steel material having a percentage of carbon content adjusted to be in a range of about 0.50% to about 1.10% by weight and a percentage of sulfur content adjusted to be about 0.015% by weight or less.

2. The vehicular bearing apparatus according to claim 1, wherein a steel type of the steel material is one selected from among JIS S53C to S58C including about 0.50% by weight to about 0.61% by weight carbon, SAE 1055 to 1095 including about 0.50% by weight to about 1.03% by weight carbon, SUJ1 to SUJ5 including about 0.95% by weight to about 1.10% by weight carbon.

3. The vehicular bearing apparatus according to claim 2 wherein said deformable material portion is formed integrally with said rotating member.

4. The vehicular hearing apparatus according to claim 3, wherein said rotating member is a hub wheel.

5. The vehicular bearing apparatus according to claim 2 wherein said deformable material portion is a portion of a rotating shaft.

6. The vehicular bearing apparatus according to claim 5 wherein said rotating member is a wheel hub and said rotating shaft extends through a center bore of said hub wheel.

7. The vehicular bearing apparatus according to claim 1 wherein said deformable material portion is formed integrally with said rotating member.

8. The vehicular bearing apparatus according to claim 7 wherein said rotating member is a hub wheel.

9. The vehicular bearing apparatus according to claim 1 wherein said deformable material portion is a portion of a rotating shaft.

10. The vehicular bearing apparatus according to claim 9 wherein said rotating member is a wheel hub and said rotating shaft extends through a center bore of said hub wheel.

* * * * *